US007556304B2

(12) United States Patent
Buescher

(10) Patent No.: US 7,556,304 B2
(45) Date of Patent: Jul. 7, 2009

(54) ACTUATION DEVICE FOR VEHICLE PANEL

(75) Inventor: Hans-Joachim Buescher, Duesseldorf (DE)

(73) Assignee: Strattec Power Access LLC, Troy, MI (US)

( * ) Notice: Subject to any disclaimer, the term of this patent is extended or adjusted under 35 U.S.C. 154(b) by 44 days.

(21) Appl. No.: 11/715,691

(22) Filed: Mar. 8, 2007

(65) Prior Publication Data

US 2007/0214602 A1 Sep. 20, 2007

(30) Foreign Application Priority Data

Mar. 14, 2006 (GB) ................................ 0605008.2
Nov. 24, 2006 (EP) ................................ 06024466

(51) Int. Cl.
*B60J 7/00* (2006.01)
*E05F 11/24* (2006.01)

(52) U.S. Cl. .......................................... 296/56; 49/340

(58) Field of Classification Search .............. 296/146.8, 296/146.4, 56
See application file for complete search history.

(56) References Cited

U.S. PATENT DOCUMENTS 6,367,199 B2 * 4/2002 Sedlak et al. ................. 49/340
6,453,614 B1 * 9/2002 Rogers et al. ................. 49/340

* cited by examiner

*Primary Examiner*—Joseph D Pape
(74) *Attorney, Agent, or Firm*—Michael Best & Friedrich LLP

(57) ABSTRACT

Arrangement, in particular for a motor vehicle, having a closing device which can be pivoted about an axis between a closed and an open position, for example a boot lid or a tailgate, a compensating device acting on the closing device, in particular at least one gas-pressure spring, which is pretensioned and a counter-force opposes the weight of the closing device, and a motor-driven drive which can be operated at least unidirectionally, in particular bidirectionally, in order to pivot the closing device about the axis in at least one direction, wherein the motor-driven drive is designed to be repellable, in order to facilitate manual actuation of the closing device. Friction means are provided, which act on the closing device both during manual actuation of the closing device and during actuation by the drive at a preset friction torque, wherein the friction torque within the pivoting range of the closing device or of a part range thereof is greater than the extent of the difference of a first torque produced by the weight of the closing device and a second torque produced by the counter-force of the compensating device.

8 Claims, 2 Drawing Sheets a)

b)

ACTUATION DEVICE FOR VEHICLE PANEL

TECHNICAL FIELD

The present invention relates to an arrangement, in particular for a motor vehicle, having a closing device which can be pivoted about an axis between a closed and an open position, for example a boot lid or a tailgate, a compensating device acting on the closing device, in particular at least one gas-pressure spring, which is pretensioned and a counter-force opposes the weight of the closing device, and a motor-driven drive which can be operated at least unidirectionally, in particular bidirectionally, in order to pivot the closing device about the axis in at least one direction, wherein the motor-driven drive is designed to be repellable, in order to facilitate manual actuation of the closing device.

BACKGROUND OF THE INVENTION

Tailgates are known for example, which may be closed by means of a motor-driven drive which can be driven unidirectionally and opened by means of gas-pressure springs. In order to facilitate the opening of such a tailgate by the gas-pressure springs, the drive is designed to be repellable. However, in such an arrangement it is not possible to hold the tailgate in a rotational position which lies between the completely opened and the completely closed position of the tailgate. Rather, the tailgate is pressed from an intermediate position always into the completely opened position when the drive is switched off due to the force exerted by the gas-pressure springs.

In order to facilitate holding of the tailgate in an intermediate position, drives are used which are not repellable. In order to also facilitate the manual opening of the tailgate by means of the gas-pressure springs, the tailgate must however then be uncoupled from the non-repellable drive. A clutch is thus provided, but which causes additional effort and costs.

In addition, drives which can be operated bidirectionally are also known, wherein here too, a clutch is necessary in order to facilitate on the one hand holding of the tailgate in an intermediate position and on the other hand manual actuation of the tailgate by a user, for example when the drive is defective or the current supply to the drive is lost.

SUMMARY OF THE INVENTION

The object of the invention is to provide an arrangement of the type mentioned in the introduction which facilitates both holding of the closing device in an intermediate position and manual actuation of the closing device and thus manages without a clutch.

This object is achieved by an arrangement having the features of claim 1, and in particular in that friction means are provided, which act on the closing device both during manual actuation of the closing device and during actuation by the drive at a preset friction torque, wherein the friction torque within the pivoting range of the closing device or of a part range thereof is greater than the extent of the difference of a first torque produced by the weight of the closing device and a second torque produced by the counter-force of the compensating device.

The weight of the closing device produces a first torque in order to pivot the closing device into a first direction of rotation. The counter-force of the compensating device, for example at least one compression spring, in particular at least one gas-pressure spring, produces a second torque in order to pivot the closing device into the direction of rotation opposing the first direction of rotation. The first torque may thus be greater than the second torque, or vice versa. The extent of the difference of the two torques directed opposite to one another produces a resulting torque which is less than the friction torque of the friction means.

Within the scope of the invention, in each case the extent of the particular torque is to be understood by the first torque, the second torque and the friction torque. The friction torque may be preset by selecting the friction means or by friction means for which the friction torque can be adjusted.

The friction torque always counteracts the resulting torque, regardless of which of the two torques directed in opposite manner is greater. This facilitates holding of the closing device in any intermediate position of the pivoting range of the closing device. If the friction torque in all rotational positions of the closing device within the pivoting range is not greater than the resulting torque, but only in a part range thereof, the closing element may be held at least in the part range. The holding function, which is guaranteed in the state of the art by a non-repellable drive, is taken over here by the friction means exerting the friction torque.

Therefore it is also possible to design the motor-driven drive to be repellable, as a result of which in turn manual actuation of the closing device by the user, for example by the driver, is facilitated without a clutch having to be provided, so that costs may be saved. The friction means are not a coupling, since the friction torque acts on the closing device even when actuating the closing device by the drive. The friction torque acting during manual actuation corresponds in particular to the friction torque acting during actuation by the drive.

The weight of the closing device may be the force which is caused by the mass of the closing device alone. In particular the force which is caused by the mass of the closing device including a tolerance to be added thereto, for example for snow situated on the closing device, is however also to be understood by the weight of the closing device.

The torques directed in opposing manner are preferably essentially the same size at least at an average operating temperature of the compensating device. For drives which can be operated bidirectionally, the torque which has to be applied manually by the motor-drive drive or by a user, in order to pivot the closing device about the axis, is thus equally low for both directions of rotation, since in each case essentially only the friction torque has to be overcome. For different size torques, the torque to be applied by the drive or manually in one of the two directions of rotation is then indeed less than the friction torque, but in the other of the two directions of rotation greater than the friction torque.

It is particularly preferable if the compensating device is designed such that the counter-force exerted by it is independent of the temperature. It is thus possible to guarantee that the ratio of the two torques directed in opposing manner is constant in the entire operating temperature range of the compensating device.

According to one embodiment of the invention, the compensating device is arranged and/or orientated such that the rotational position of the closing device, in which the first torque assumes a maximum value, corresponds essentially to the rotational position of the closing device, in which the second torque assumes a maximum value. It is thus possible to guarantee with suitable coupling and orientation of the compensating device with respect to the closing device, that the ratio of the two torques directed in opposing manner is essentially constant in all rotational positions of the closing device which lie within the pivoting range or the part range thereof.

According to a further embodiment of the invention, the friction torque is the same size in all rotational positions of the closing device which lie within the pivoting range or the part range thereof. The friction torque in the pivoting range or the part range thereof is thus greater than the extent of the maximum difference of the first torque and the second torque.

According to a further embodiment of the invention, the friction means comprise a brake. A preset friction torque may thus be produced exactly and reliably. The brake may be, for example a magnetic brake, which can be operated preferably without maintenance.

The friction means may be connected, for example by one part rigidly to a wall, in particular of a motor vehicle, and by a further part rigidly to the axis or a shaft of the drive, wherein the friction torque can be produced between the two parts.

According to a further embodiment of the invention, the compensating device, in particular a gas-pressure spring, is provided on the one side of the closing device, and the drive is provided on the other side of the closing device. In particular in this case, the drive may be designed as a linear drive, wherein the linear drive may be designed with a shape similar to the compensating device.

Further advantageous embodiments of the invention are indicated in the sub-claims, the description and the drawings.

Non-restricting exemplary embodiments of the invention are shown in the drawing and are described below.

BRIEF DESCRIPTION OF THE DRAWINGS

The following show in each case in schematic representation.

DESCRIPTION OF THE PREFERRED EMBODIMENT

Figure 1:
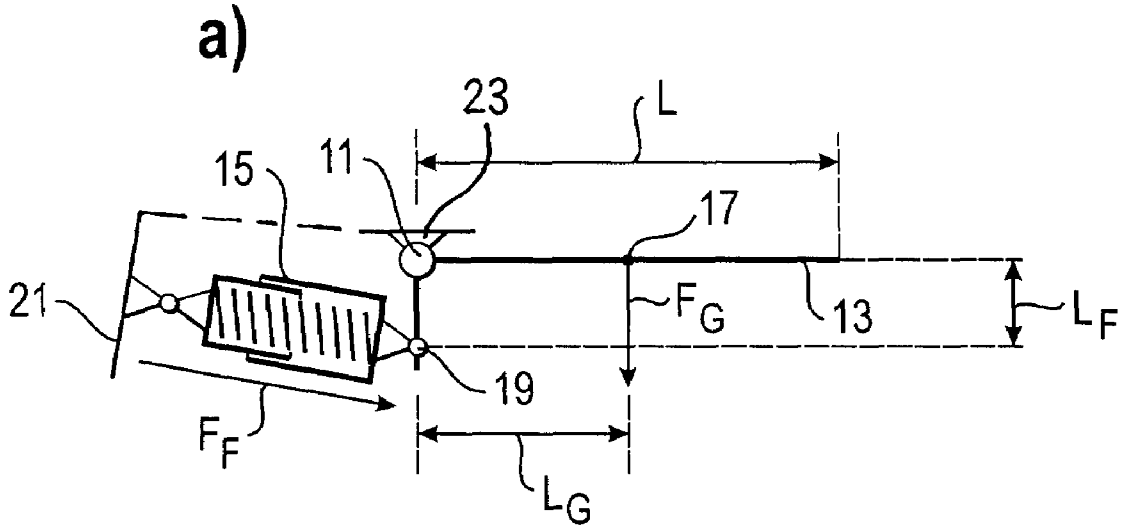
FIG. 1 is side views of a tailgate of a motor vehicle according to a first exemplary embodiment of the arrangement, in an open and a closed rotational position.
Figure 1:
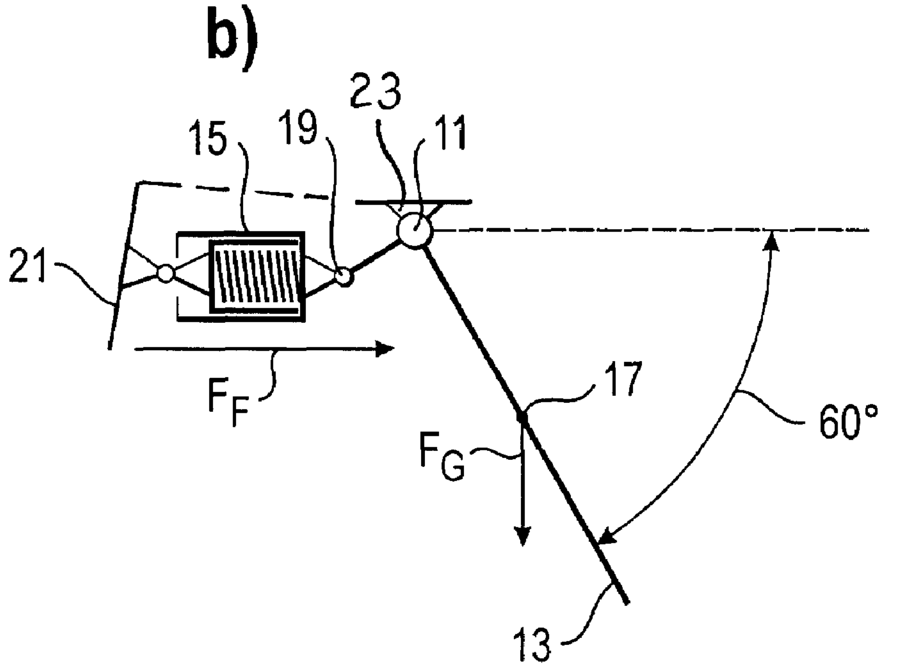

The tailgate 13 shown in FIGS. 1*a* and 1*b* can be pivoted about an axis 11 in order to close or to open the rear of a motor vehicle. The tailgate 13 is thus coupled to a motor-driven drive not shown, which can be operated bidirectionally and comprises an electromotor in order to pivot the tailgate 13 both clockwise into the closed rotational position shown in FIG. 1*b* and counter-clockwise into the open rotational position shown in FIG. 1*a*. The drive is thus designed to be repellable in order to facilitate manual actuation of the tailgate 13 in spite of the drive.

Furthermore, a pretensioned gas-pressure spring 15 is provided on at least one side of the tailgate 13. The gas-pressure spring 15 is coupled on the one side to a wall 21 of the motor vehicle and on the other side to the tailgate 13. Coupling to the tailgate 13 takes place at a coupling point 19 of the tailgate 13 opposite the center of gravity 17 of the tailgate 13 with respect to the axis 11, wherein the coupling point 19 lies closer to the axis 11 than the center of gravity 17 of the tailgate 13. The part of the tailgate 13 having the coupling point 19 is thus arranged at right-angles to the part of the tailgate 13 having the center of gravity 17.

The arrangement is selected such that in the open rotational position according to FIG. 1*a*, the weight $F_G$ of the tailgate 13, wherein the tailgate 13 is arranged to be horizontal in the open rotational position, and the spring force $F_F$ exerted by the gas-pressure spring 15, are in each case essentially vertical on their particular force or lever arm with respect to the axis 11.

In the open rotational position according to FIG. 1*a*, a first torque $M_G$ is produced by the weight $F_G$ of the tailgate 13, the center of gravity 17 of which is situated at a distance $L_G$ from the axis 11 in order to rotate the tailgate 13 clockwise, wherein $$M_G = F_G \cdot L_G. \tag{1}$$

In the open rotational position according to FIG. 1*a*, a second torque $M_F$ is produced by the gas-pressure spring 15, which exerts a spring force $F_F$ and the coupling point 19 of which is situated at a distance $L_F$ from the axis 11 in order to rotate the tailgate 13 counter-clockwise, wherein at least essentially $$M_F = F_F \cdot L_F. \tag{2}$$

The torque $M_G$ produced by the weight $F_G$ and the torque $M_F$ produced by the spring force $F_F$, in the open rotational position of the tailgate 13 shown in FIG. 1*a* or at least close to this rotational position, assume in each case a maximum value within the pivoting range of the tailgate 13.

The spring force $F_F$ of the gas-pressure spring 15 thus opposes the weight $F_G$ of the tailgate 13, so that the tailgate 13 is subjected to a resulting torque which corresponds to the difference of the two torques $M_G$ and $M_F$.

If the gas-pressure spring 15 is transferred from the open rotational position to the closed rotational position shown in FIG. 1*b*, the proportions of the weight $F_G$ and the spring force $F_F$ contributing to the torques $M_G$ and $M_F$ and hence the torques $M_G$ and $M_F$—apart from the range situated in closest proximity to the open rotational position—decrease continuously essentially in the same ratio. In particular the ratio of the two torques $M_G$ and $M_F$ is essentially constant in all rotational positions of the tailgate 13 within the pivoting range between the open rotational position and the closed rotational position.

In the closed rotational position according to FIG. 1*b*, in which the tailgate is rotated by 60° with respect to the open rotational position, a first torque $M_G$ is now produced by the weight $F_G$ of the tailgate 13, wherein $$M_G = \tfrac{1}{2} \cdot F_G \cdot L_G. \tag{3}$$

In the closed rotational position according to FIG. 1*b*, a second torque $M_F$ is produced by the gas-pressure spring 15, which exerts the spring force $F_F$, wherein at least essentially $$M_F = \tfrac{1}{2} \cdot F_F \cdot L_F. \tag{4}$$

The arrangement also comprises a maintenance-free magnetic brake 23, which is connected by one part rigidly to a vehicle wall 21 and by a further part rigidly to the axis 11 or a shaft of the drive, wherein one of the two parts can be rotated about the other of the two parts, wherein between the two parts during rotation a constant friction torque $M_R$ is produced, which is the same size over the entire operating temperature range of the arrangement and over the entire pivoting range of the tailgate 13 and opposes the resulting torque. This applies both for manual and for drive-side actuation of the tailgate 13.

The friction torque $M_R$ is thus selected and/or adjusted such that in any rotational position of the pivoting range of the tailgate 13, it is greater than the extent of the difference of the first torque $M_G$ produced by the weight $F_G$ and the second torque $M_F$ produced by the spring force $F_F$ of the gas-pressure spring 15, so that the tailgate 15 may be held in any intermediate position when the drive is switched off:

$$M_R > |M_G - M_F|. \tag{5}$$

So that the tailgate 15 may be held within the entire pivoting range, it is necessary that the friction torque $M_R$ is greater than the maximum occurring extent in the pivoting range of the difference of the first torque $M_G$ and the second torque $M_F$.

In order to actuate the tailgate 13 by the drive, the drive must apply the following torque M in each rotational position of the pivoting range of the tailgate 13:

During opening:

$$M>M_G-M_F+M_R. \quad (6)$$

During closing:

$$M>M_F-M_G+M_R. \quad (7)$$

In order to actuate the tailgate 13 manually, the user must apply the following torque M in each rotational position of the pivoting range of the tailgate 13:

During opening:

$$M>M_G-M_F+M_R+M_A. \quad (8)$$

wherein $M_A$ corresponds to the torque to be applied for repelling the drive.

During closing:

$$M>M_F-M_G+M_R+M_A. \quad (9)$$

The weight $F_G$, the spring force $F_F$, the distance $L_G$ and the distance $L_F$ are preferably selected such that the torques $M_G$ and $M_F$ acting in opposing manner are essentially the same size at least in one rotational position of the pivoting range of the tailgate 13:

$$M_G=M_F. \quad (10)$$

Due to the arrangement selected in FIGS. 1*a* and *b* and orientation of the gas-pressure spring 15 with respect to the tailgate 13, it is ensured that the two torques $M_G$ and $M_F$ acting in opposing manner are also essentially the same size in the other rotational positions of the pivoting range.

It is thus guaranteed that the torque to be applied by the drive or by a user in order to open or to close the tailgate 13 is as low as possible for both directions of rotation.

Conventionally the extent of the difference of the first torque $M_G$ and the second torque $M_F$ over the various rotational positions of the tailgate 13 will not be constantly 0, but will vary within certain limits and/or slightly. In order to guarantee essentially the same size torques $M_G$ and $M_F$ for all operating temperatures of the arrangement, a temperature-compensating gas-pressure spring 15 is preferably used, that is a gas-pressure spring 15, in which the exerted spring force $F_F$ is independent of the temperature to the greatest possible extent.

For gas-pressure springs 15, the spring force $F_F$ of which varies with the temperature, the spring force $F_F$ may be selected such that at least in an average operating temperature range of the gas-pressure spring 15, the torques $M_G$ and $M_F$ directed in opposing manner have essentially the same size. At a lower temperature, the spring force $F_F$ is then correspondingly smaller, so that even the torque $M_F$ produced by the spring force $F_F$ is less than the torque $M_G$ produced by the weight $F_G$. At a higher temperature, the spring force $F_F$ is then correspondingly greater, so that even the torque $M_F$ produced by the spring force $F_F$ is greater than the torque $M_G$ produced by the weight $F_G$.

Figure 2:
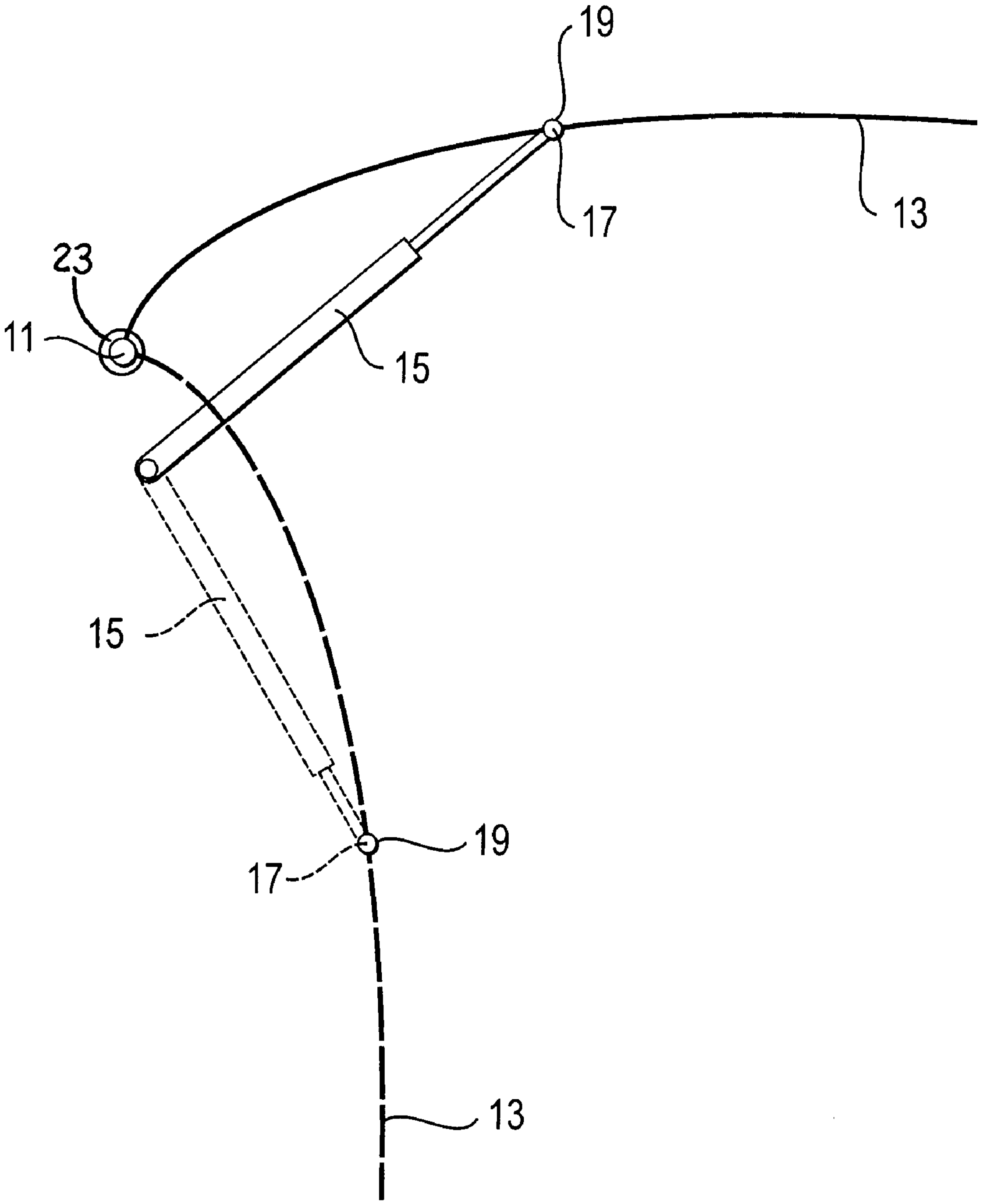
FIG. 2 is a side view of a tailgate of a motor vehicle according to a second exemplary embodiment of the arrangement, in an open and a closed rotational position.

However, the gas-pressure spring 15 may also be orientated to the tailgate 13 and/or coupled to the tailgate 13 in a manner different to that shown in FIGS. 1*a* and *b*. For example an arrangement is also conceivable, in which the gas-pressure spring 15 is coupled to the tailgate 13 at a lateral coupling point 19 at the level of the center of gravity 17 of the closing device 13, as shown in FIG. 2, wherein the arrangement in the open rotational position is shown by continuous lines and in the closed rotational position by a dashed line. The central center of gravity 17 with respect to the tailgate 13 and the lateral coupling point 19 with respect to the tailgate 13 thus coincide only in the side view of FIG. 2. Otherwise the explanations given above regarding FIGS. 1*a* and *b* can however be transferred essentially analogously to the arrangement according to FIG. 2.

On the whole using the arrangement of the invention, a possibility is produced of guaranteeing holding of a closing device in any intermediate position, from which manual actuation of the closing device is possible without coupling.

The invention claimed is:

1. An actuation device for a motor vehicle, having a closing device which can be pivoted about an axis between a closed and an open position, a compensating device acting on the closing device, which is pretensioned and a counter-force ($F_F$) opposes the weight ($F_G$) of the closing device, and a motor-driven drive which can be operated at least unidirectionally, in order to pivot the closing device about the axis in at least one direction, wherein the motor-driven drive is repellable, in order to facilitate manual actuation of the closing device, wherein friction means are provided, which act on the closing device both during manual actuation of the closing device and during actuation by the drive at a preset friction torque, wherein the friction torque within pivoting range of the closing device or of a part range thereof is greater than the extent of the difference of a first torque ($M_G$) produced by the weight ($F_G$) of the closing device and a second torque ($M_F$) produced by the counter-force ($F_F$) of the compensating device.

2. The device of claim 1, wherein the torques ($M_G$, $M_F$) directed in opposing manner are essentially the same size at least at an average operating temperature of the compensating device.

3. The device of claim 1, wherein the compensating device is designed such that the counter-force ($F_F$) exerted by said compensating device is independent of the temperature.

4. The device of claim 1, wherein the compensating device is arranged and/or orientated such that the rotational position of the closing device, in which the first torque ($M_G$) assumes a maximum value, corresponds essentially to the rotational position of the closing device, in which the second torque ($M_F$) assumes a maximum value.

5. The device of claim 1, wherein the friction torque is the same size in all rotational positions of the closing device which lie within the pivoting range or the part range thereof.

6. The device of claim 1, wherein the friction means comprise a brake.

7. The device of claim 1, wherein the friction means are connected by one part rigidly to a wall, and by a further part rigidly to the axis or a shaft of the drive, wherein the friction torque can be produced between the two parts.

8. The device of claim 1, wherein the compensating device, is provided on the one side of the closing device, and the drive is provided on the other side of the closing device.

* * * * *